(12) United States Patent
Machida et al.

(10) Patent No.: US 10,744,902 B2
(45) Date of Patent: Aug. 18, 2020

(54) COOLING DEVICE FOR BATTERY INCLUDING AN INTAKE AIR TEMPERATURE SENSOR

(71) Applicant: TOYOTA JIDOSHA KABUSHIKI KAISHA, Toyota-shi, Aichi-ken (JP)

(72) Inventors: Kiyohito Machida, Aichi-ken (JP); Nobuyuki Tanaka, Toyota (JP); Teruo Ishishita, Miyoshi (JP); Keiichi Minamiura, Nagoya (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 703 days.

(21) Appl. No.: 15/514,631

(22) PCT Filed: Sep. 28, 2015

(86) PCT No.: PCT/IB2015/001701
§ 371 (c)(1),
(2) Date: Mar. 27, 2017

(87) PCT Pub. No.: WO2016/051249
PCT Pub. Date: Apr. 7, 2016

(65) Prior Publication Data
US 2017/0240065 A1 Aug. 24, 2017

(30) Foreign Application Priority Data

Sep. 29, 2014 (JP) .................... 2014-198269

(51) Int. Cl.
*B60L 58/26* (2019.01)
*H01M 10/613* (2014.01)
(Continued)

(52) U.S. Cl.
CPC .......... *B60L 58/26* (2019.02); *B60H 1/00278* (2013.01); *B60L 1/003* (2013.01);
(Continued)

(58) Field of Classification Search
CPC ...... B60L 11/1874; B60L 58/24; B60L 58/26; B60L 1/003; B60L 3/00; B60L 3/04;
(Continued)

(56) References Cited

U.S. PATENT DOCUMENTS 5,937,664 A  8/1999 Matsuno et al.
6,377,880 B1 * 4/2002 Kato ................. B60K 6/485
                                                701/32.9
(Continued)

FOREIGN PATENT DOCUMENTS

JP   H10-064598 A   3/1998
JP   H10-306722 A   11/1998
(Continued)

*Primary Examiner* — Richard Isla
*Assistant Examiner* — Manuel Hernandez
(74) *Attorney, Agent, or Firm* — Sughrue Mion PLLC

(57) ABSTRACT

A cooling device for a battery that is mounted in a vehicle includes: a cooling fan that is configured to suck air in a vehicle interior, and to blow the sucked air to the battery; an intake air temperature sensor that is configured to detect a temperature of the air sucked by the cooling fan; and an electronic control unit that is configured (i) to control the cooling fan, and (ii) to prohibit the cooling fan from being operated when a detected value of the intake air temperature sensor is lower than a first temperature.

4 Claims, 7 Drawing Sheets

(51) Int. Cl.
    *H01M 10/625*     (2014.01)
    *H01M 10/6563*     (2014.01)
    *B60L 3/04*     (2006.01)
    *B60L 3/00*     (2019.01)
    *B60L 1/00*     (2006.01)
    *B60H 1/00*     (2006.01)
    *B60L 58/24*     (2019.01)
    *B60L 11/18*     (2006.01)
    *H01M 10/633*     (2014.01)
    *H01M 10/48*     (2006.01)

(52) U.S. Cl.
    CPC .................. *B60L 3/00* (2013.01); *B60L 3/04* (2013.01); *B60L 11/1874* (2013.01); *B60L 58/24* (2019.02); *H01M 10/486* (2013.01); *H01M 10/613* (2015.04); *H01M 10/625* (2015.04); *H01M 10/633* (2015.04); *H01M 10/6563* (2015.04); *B60H 2001/003* (2013.01); *B60L 2240/36* (2013.01); *B60L 2240/545* (2013.01); *H01M 2220/20* (2013.01); *Y02T 10/705* (2013.01); *Y02T 10/7005* (2013.01)

(58) Field of Classification Search
    CPC ........... B60L 2240/545; B60L 2240/36; B60H 1/00278; B60H 2001/003; H01M 10/486; H01M 10/633; H01M 10/6563; H01M 10/625; H01M 10/613; H01M 10/635; H01M 2220/20; Y02T 10/705; Y02T 10/7005; Y02E 60/12
    USPC .......................................... 320/150; 429/120
    See application file for complete search history.

(56) References Cited

U.S. PATENT DOCUMENTS

| | | | | |
|---|---|---|---|---|
| 6,936,372 | B1 * | 8/2005 | Jagota | H01M 2/1077 |
| | | | | 429/50 |
| 8,239,095 | B2 * | 8/2012 | Kikuchi | B60K 6/365 |
| | | | | 701/36 |
| 9,517,678 | B2 * | 12/2016 | Matsuda | B60H 1/00457 |
| 2003/0087148 | A1 * | 5/2003 | Minamiura | H01M 10/482 |
| | | | | 429/62 |
| 2004/0257089 | A1 * | 12/2004 | Aridome | H01M 10/486 |
| | | | | 324/430 |
| 2006/0036883 | A1 * | 2/2006 | Hashizumi | H01M 10/486 |
| | | | | 713/300 |
| 2006/0214640 | A1 * | 9/2006 | Woo | H01M 10/633 |
| | | | | 320/150 |
| 2007/0072061 | A1 | 3/2007 | Shimizu | |
| 2007/0178346 | A1 | 8/2007 | Kiya et al. | |
| 2009/0249803 | A1 * | 10/2009 | Suzuki | B60L 1/003 |
| | | | | 62/56 |
| 2010/0090527 | A1 * | 4/2010 | Tarnowsky | B60H 1/00278 |
| | | | | 307/10.7 |
| 2010/0155162 | A1 * | 6/2010 | Nakamura | H01M 10/48 |
| | | | | 180/65.29 |
| 2010/0225264 | A1 * | 9/2010 | Okuda | B60K 1/04 |
| | | | | 318/473 |
| 2011/0042058 | A1 | 2/2011 | Kikuchi et al. | |
| 2013/0298586 | A1 * | 11/2013 | Hwang | B60K 1/04 |
| | | | | 62/239 |
| 2014/0335771 | A1 * | 11/2014 | Kikuchi | H01M 10/613 |
| | | | | 454/75 |
| 2015/0232087 | A1 * | 8/2015 | Masuda | B60L 1/003 |
| | | | | 701/22 |
| 2016/0159194 | A1 * | 6/2016 | Minamiura | B60H 1/00278 |
| | | | | 165/202 |
| 2016/0204478 | A1 * | 7/2016 | Iguchi | B60L 58/18 |
| | | | | 429/62 |
| 2016/0301115 | A1 * | 10/2016 | Izumi | H01M 10/625 |
| 2016/0301116 | A1 * | 10/2016 | Ochiai | B60L 3/0046 |
| 2016/0301119 | A1 * | 10/2016 | Izumi | H01M 10/613 |
| 2020/0079226 | A1 * | 3/2020 | Gaither | B60L 58/26 |

FOREIGN PATENT DOCUMENTS

| | | | |
|---|---|---|---|
| JP | 2001-210389 | A | 8/2001 |
| JP | 2002-051479 | A | 2/2002 |
| JP | 2005-310596 | A | 11/2005 |
| JP | 2007153054 | A * | 6/2007 |
| JP | 2010163095 | A * | 7/2010 |
| JP | 4561743 | B2 | 8/2010 |
| JP | 5369371 | B2 | 9/2013 |
| JP | 5919845 | B2 * | 5/2016 |
| KR | 1020070035969 | A | 4/2007 |
| KR | 1020090091225 | A | 8/2009 |

\* cited by examiner

COOLING DEVICE FOR BATTERY INCLUDING AN INTAKE AIR TEMPERATURE SENSOR

CROSS REFERENCE TO RELATED APPLICATIONS

This application is a National Stage of International Application No. PCT/IB2015/001701 filed Sep. 28, 2015, claiming priority based on Japanese Patent Application No. 2014-198269 filed Sep. 29, 2014, the contents of all of which are incorporated herein by reference in their entirety.

BACKGROUND OF THE INVENTION

1. Field of the Invention

The invention relates to a cooling device for a battery, and more particularly, to a cooling device for a battery that is mounted in a vehicle.

2. Description of Related Art

A vehicle that is equipped with a battery and a cooling fan that blows the air in a vehicle interior to the battery is disclosed in U.S. Pat. No. 4,561,743. In the case where the battery is at a high temperature, the cooling fan is operated. Thus, the battery is cooled.

In general, the cooling fan is provided with a bearing portion that supports a rotary shaft for rotating the fan. An oil film of lubricating oil is formed between the rotary shaft and the bearing portion. This oil film prevents the rotary shaft and the bearing portion from coming into contact (metal touch) with each other, thus protecting the bearing portion.

However, with the periphery of (the atmosphere around) the cooling fan at an extremely low temperature, the lubricating oil in the cooling fan exhibits high viscosity, so a sufficient amount of lubricating oil may not be supplied to the bearing portion of the cooling fan. When the cooling fan is operated in this state, the oil film protecting the bearing portion of the cooling fan breaks, and the bearing portion is chipped off through metal touch. As a result, the cooling fan may undergo a failure.

SUMMARY OF THE INVENTION

The invention provides a cooling device for a battery that restrains a cooling fan from undergoing a failure in a vehicle that is equipped with the battery and the cooling fan, which cools the battery.

A cooling device according to a first aspect of this invention is a cooling device for a battery that is mounted in a vehicle. This cooling device is equipped with a cooling fan, an intake air temperature sensor, and an electronic control unit. The cooling fan is configured to suck air in a vehicle interior, and to blow the sucked air to the battery. The intake air temperature sensor is configured to detect a temperature of the air sucked by the cooling fan. The electronic control unit is configured to control the cooling fan. The electronic control unit is configured to prohibit the cooling fan from being operated when a detected value of the intake air temperature sensor is lower than a first temperature.

According to this configuration, the cooling fan is prohibited from being operated when the detected value of the intake air temperature sensor is lower than the first temperature (when the periphery of the cooling fan is at an extremely low temperature, and an oil film may break on a bearing portion of the cooling fan). Therefore, the cooling fan can be prevented from undergoing a failure by being operated with the periphery of the cooling fan at an extremely low temperature.

Preferably, the electronic control unit may be configured to operate the cooling fan when a temperature of the battery is equal to or higher than a second temperature and the detected value of the intake air temperature sensor is equal to or higher than the first temperature, and may be configured to prohibit the cooling fan from being operated when the temperature of the battery is equal to or higher than the second temperature and the detected value of the intake air temperature sensor is lower than the first temperature.

According to this configuration, even in the case where the temperature of the battery is equal to or higher than the second temperature (in the case where the temperature of the battery is high), when the detected value of the intake air temperature sensor is lower than the first temperature, the cooling fan is prohibited from being operated. Therefore, the cooling fan can be prevented from undergoing a failure, in priority to the cooling of the battery.

Preferably, the electronic control unit may be configured to operate the cooling fan regardless of whether or not the detected value of the intake air temperature sensor is lower than the first temperature, when the temperature of the battery is equal to or higher than a third temperature that is higher than the second temperature.

According to this configuration, even in the case where the detected value of the intake air temperature sensor is lower than the first temperature, when the temperature of the battery is equal to or higher than the third temperature that is higher than the second temperature (when the temperature of the battery is higher and the battery may deteriorate), the cooling fan is operated. Therefore, the battery can be restrained from deteriorating, in priority to the prevention of a failure in the cooling fan.

Preferably, the electronic control unit may be configured to control the cooling fan through feedback such that an actual rotational speed of the cooling fan becomes equal to a target rotational speed. The electronic control unit may be configured to prohibit the cooling fan from being operated when the detected value of the intake air temperature sensor is lower than the first temperature and a difference between the actual rotational speed of the cooling fan and the target rotational speed is outside a range that is determined in advance.

According to this configuration, in the case where the detected value of the intake air temperature sensor is lower than the first temperature, when the difference between the actual rotational speed of the cooling fan and the target rotational speed is outside the range that is determined in advance (when the rotary shaft of the cooling fan does not rotate normally), the cooling fan is prohibited from being operated. Therefore, the cooling fan can be more reliably prevented from being unnecessarily prohibited from being operated, and the number of opportunities for operation of the cooling fan can be made larger than in the case where the cooling fan is uniformly prohibited from being operated when the detected value of the intake air temperature sensor is lower than the first temperature.

Preferably, the electronic control unit may be configured to execute an operation check for confirming whether or not the cooling fan operates normally by outputting an operation command to the cooling fan, when the detected value of the intake air temperature sensor is equal to or higher than the first temperature, and to refrain from executing the operation check when the detected value of the intake air temperature sensor is lower than the first temperature, in a case where execution of the operation check is requested.

According to this configuration, even in the case where execution of the operation check of the cooling fan is requested, when the detected value of the intake air temperature sensor is lower than the first temperature, the operation check is not executed. Therefore, the cooling fan can be prevented from undergoing a failure through the operation check.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
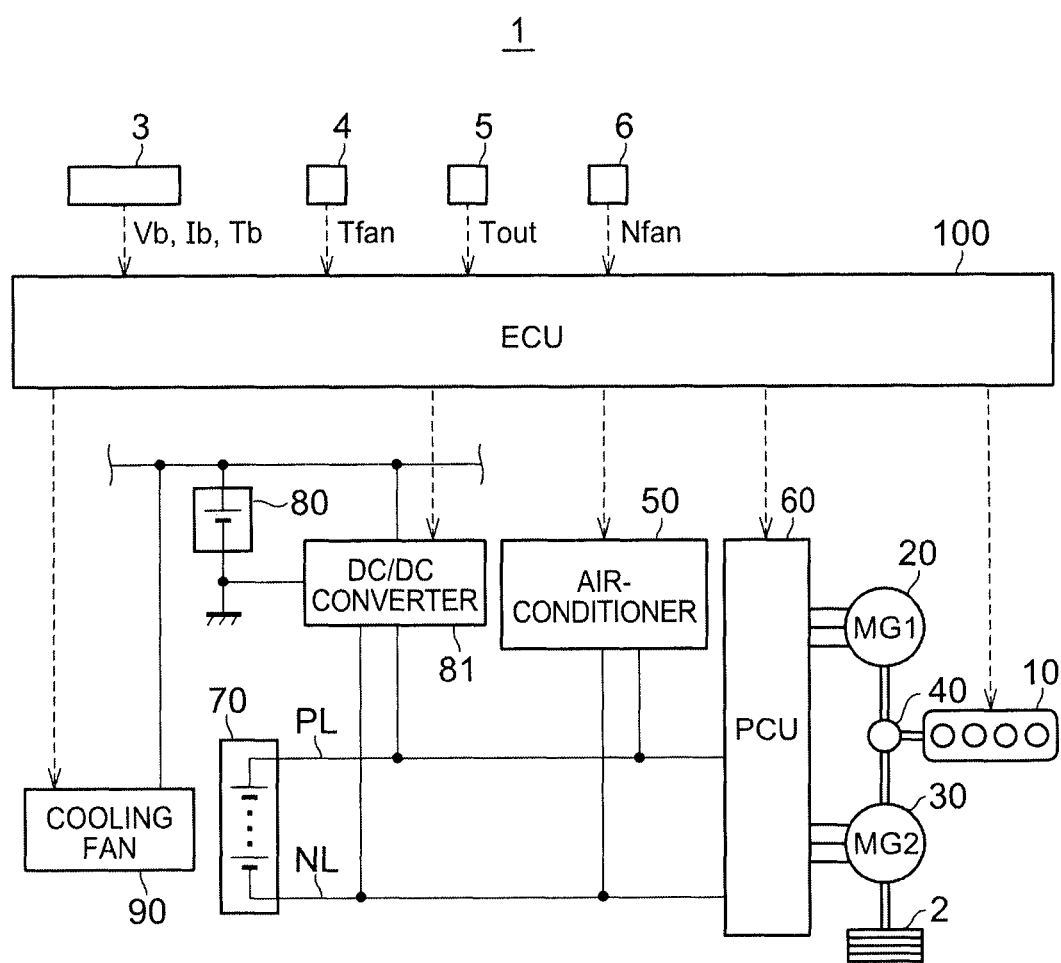
FIG. 1 is an overall configuration view of a vehicle according to the invention.

The embodiments of the invention will be described hereinafter in detail with reference to the drawings. Incidentally, like or equivalent components in the drawings are denoted by like reference symbols, and the description thereof will not be repeated.

First Embodiment

FIG. 1 is an overall configuration view of a vehicle 1 according to the embodiment of the invention. The vehicle 1 is equipped with an engine 10, a first motor-generator (which will be referred to hereinafter as "a first MG" as well) 20, a second motor-generator (which will be referred to hereinafter as "a second MG" as well) 30, a motive power division unit 40, an air-conditioner 50, a power control unit (a PCU) 60, a battery 70, an auxiliary battery 80, a DC/DC converter 81, a cooling fan 90, and an electronic control unit (an ECU) 100.

The vehicle 1 is a hybrid vehicle that runs by a motive power that is output from at least one of the engine 10 and the second MG 30. The motive power of the engine 10 is divided by the motive power division unit 40 into a motive power transmitted through a route to a driving wheel 2 and a motive power transmitted through a route to the first MG 20.

The first MG 20 generates an electric power through the use of the motive power of the engine 10 divided by the motive power division unit 40. The second MG 30 generates a motive power through the use of at least one of an electric power stored in the battery 70 and the electric power generated by the first MG 20. The motive power of the second MG 30 is transmitted to the driving wheel 2. Incidentally, at the time of braking of the vehicle 1 or the like, the second MG 30 is driven by the driving wheel 2, and the second MG 30 operates as a generator. Thus, the second MG 30 functions also as a regenerative brake that converts kinetic energy of the vehicle into an electric power. The regenerative electric power generated by the second MG 30 is stored into the battery 70.

The PCU 60 is connected to the battery 70 via electric power lines PL and NL. The PCU 60 converts a DC electric power stored in the battery 70 into an AC electric power capable of driving the first MG 20 and the second MG 30, and outputs this AC electric power to the first MG 20 and/or the second MG 30. Thus, the first MG 20 and/or the second MG 30 are/is driven by the electric power stored in the battery 70. Besides, the PCU 60 converts the AC electric power generated by the first MG 20 and/or the second MG 30 into a DC electric power with which the battery 70 can be charged, and outputs this DC electric power to the battery 70. Thus, the battery 70 is charged with the electric power generated by the first MG 20 and/or the second MG 30.

The battery 70 stores the electric power for driving the first MG 20 and/or the second MG 30. The battery 70 is configured to include a plurality of secondary battery cells (e.g., nickel-metal hydride battery cells or lithium-ion secondary battery cells) that are connected in series to one another. The voltage of the battery 70 is relatively high, and is equal to, for example, about 300 V.

The air-conditioner 50 is electrically connected to the electric power lines PL and NL, and operates by the high-voltage electric power supplied from the electric power lines PL and NL. The air-conditioner 50 adjusts the temperature of (cools or warms) the air in a vehicle interior.

The auxiliary battery 80 stores an electric power for operating a plurality of auxiliary loads that are mounted in the vehicle 1. The auxiliary battery 80 is configured to include, for example, a lead storage battery. The voltage of the auxiliary battery 80 is lower than the voltage of the battery 70, and is equal to, for example, about 12 V or about 24 V. Incidentally, the plurality of the auxiliary loads include the cooling fan 90, the ECU 100, various sensors, and other apparatuses (e.g., an audio apparatus (not shown), a lighting apparatus (not shown), a car navigation apparatus (not shown), and the like).

The DC/DC converter 81 is electrically connected to the electric power lines PL and NL, steps down the voltage supplied from the electric power lines PL and NL, and supplies the voltage thus stepped down to the auxiliary battery 80 and the plurality of the auxiliary loads.

The cooling fan 90 is configured to include a motor that is controlled by the ECU 100, and a fan that is connected to a rotary shaft of the motor. Upon operating, the cooling fan 90 sucks the air in the vehicle interior, and blows the sucked air to the battery 70. The blow mode (the fan type) of the cooling fan 90 may be either a centrifugal mode (a sirocco fan or the like) or an axial flow mode (a propeller fan).

Furthermore, the vehicle 1 is equipped with a monitoring unit 3, an intake air temperature sensor 4, an outside air temperature sensor 5, and a rotational speed sensor 6. The monitoring unit 3 detects a voltage of the battery 70 (which will be referred to hereinafter as "a battery voltage Vb"), a current of the battery 70 (which will be referred to hereinafter as "a battery current Ib"), and a temperature of the battery 70 (which will be referred to hereinafter as "a battery temperature Tb"). The intake air temperature sensor 4 is a sensor for detecting a temperature of the air sucked into the cooling fan (which will be referred to hereinafter as "a fan intake air temperature Tfan"). The outside air temperature sensor 5 detects a temperature of the air outside the vehicle 1 (which will be referred to hereinafter as "an outside air temperature Tout"). The rotational speed sensor 6 detects a motor rotational speed of the cooling fan 90 (which will be referred to hereinafter simply as "a fan rotational speed Nfan"). These sensors output detected results to the ECU 100.

A central processing unit (a CPU) (not shown) and a memory (not shown) are built in the ECU 100. The ECU 100 controls various apparatuses of the vehicle 1 (the engine 10, the PCU 60, the air-conditioner 50, the DC/DC converter 81, the cooling fan 90 and the like) based on information stored in the memory and information from the respective sensors.

In operating the cooling fan 90, the ECU 100 controls the cooling fan 90 through feedback such that the fan rotational speed Nfan becomes equal to a target rotational speed Nfan_tag (see FIG. 7, which will be described later). Incidentally, the target rotational speed Nfan_tag may be a fixed value that is determined in advance, or a value that varies in accordance with the battery temperature Tb.

Figure 2:
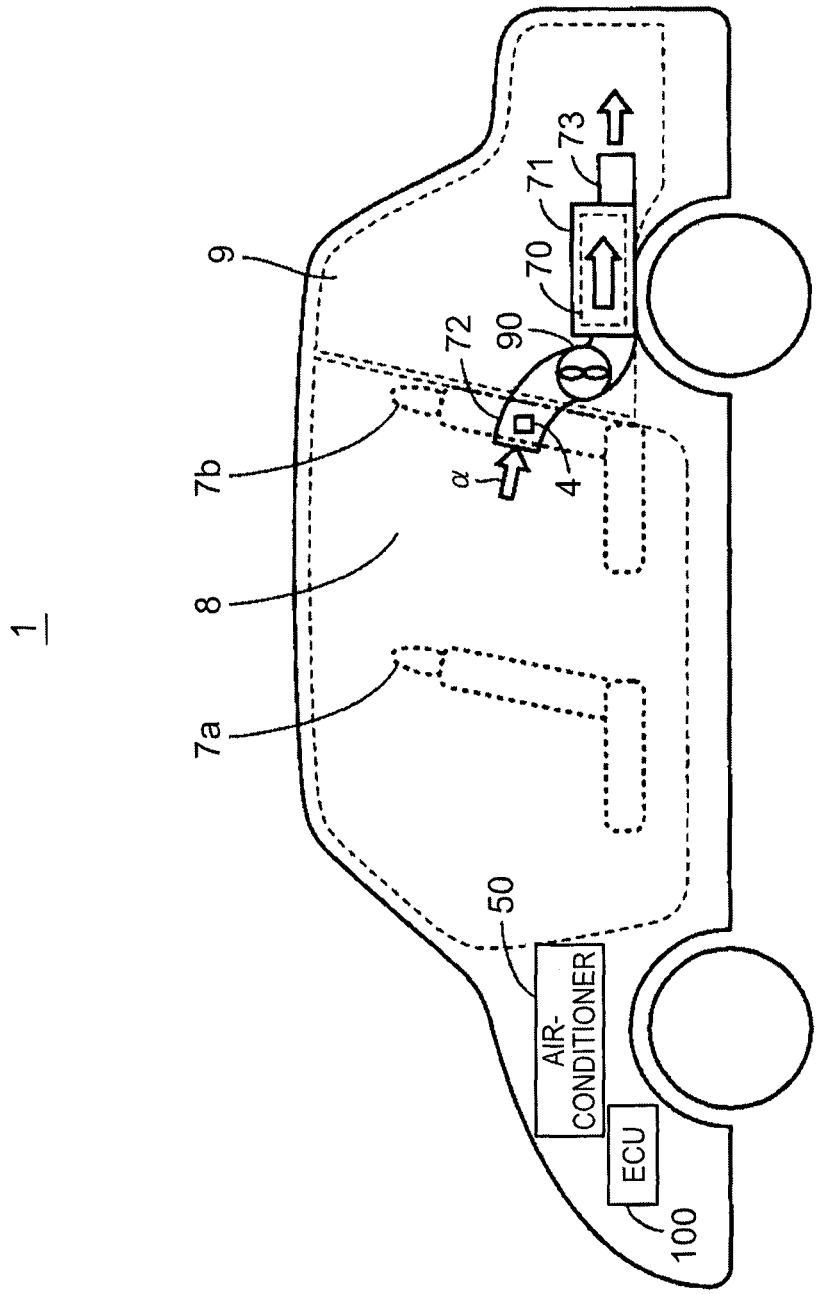
FIG. 2 is a view schematically showing an exemplary arrangement of a battery and a cooling fan according to the invention.

FIG. 2 is a view schematically showing an exemplary arrangement of the battery 70 and the cooling fan 90. A passenger compartment 8 and a luggage space 9 are provided in the interior of the vehicle 1. The temperature in the passenger compartment 8 is adjusted by the air-conditioner 50, which is provided in front of the passenger compartment 8 with respect to the vehicle. Front seats 7a and rear seats 7b in which passengers (users) are seated are provided in the passenger compartment 8. The luggage space 9 is provided behind the rear seats 7b with respect to the vehicle. Incidentally, the passenger compartment 8 and the luggage space 9 may communicate with each other above the rear seats 7b.

The battery 70 is accommodated in a battery case 71, and is arranged in the luggage space 9. The interior of the battery case 71 is held in communication with the passenger compartment 8 by an intake duct 72, and is held in communication with the luggage space 9 by an exhaust duct 73.

The cooling fan 90 and the intake air temperature sensor 4 are arranged in the intake duct 72. Incidentally, FIG. 2 shows an example in which the intake air temperature sensor 4 is arranged upstream of the cooling fan 90 (in front with respect to the vehicle). However, the intake air temperature sensor 4 may be arranged downstream of the cooling fan 90 (between the cooling fan 90 and the battery 70).

Arrows a shown in FIG. 2 indicate the flow of cooling wind. Upon being operated, the cooling fan 90 sucks the air in the passenger compartment 8, whose temperature is adjusted (which is cooled) by the air-conditioner 50, and blows the sucked air into the battery case 71 as cooling wind. The air blown into the battery case 71 exchanges heat with the battery 70 to cool the battery 70, and then is discharged into the luggage space 9 through the exhaust duct 73.

In the vehicle 1 configured as described above, when the vehicle 1 is caused to run to charge/discharge the battery 70, a current flows through the battery 70, so the battery temperature Tb rises. When the battery temperature Tb exceeds a permissible temperature Tb2 (e.g., 40° C.), the battery 70 may deteriorate. Therefore, when the battery temperature Tb is equal to or higher than a temperature Tb1 (e.g., 36° C.) that is lower than the permissible temperature Tb2, it is desirable to operate the cooling fan 90 to cool the battery 70 and thus ensure that the battery temperature Tb does not exceed the permissible temperature Tb2 (e.g., 40° C.).

However, when the cooling fan 90 is operated in the case where the periphery of (the atmosphere around) the cooling fan 90 is at an extremely low temperature (e.g., lower than −30° C.), the cooling fan 90 may undergo a failure. This point will be described with reference to FIG. 3.

Figure 3:
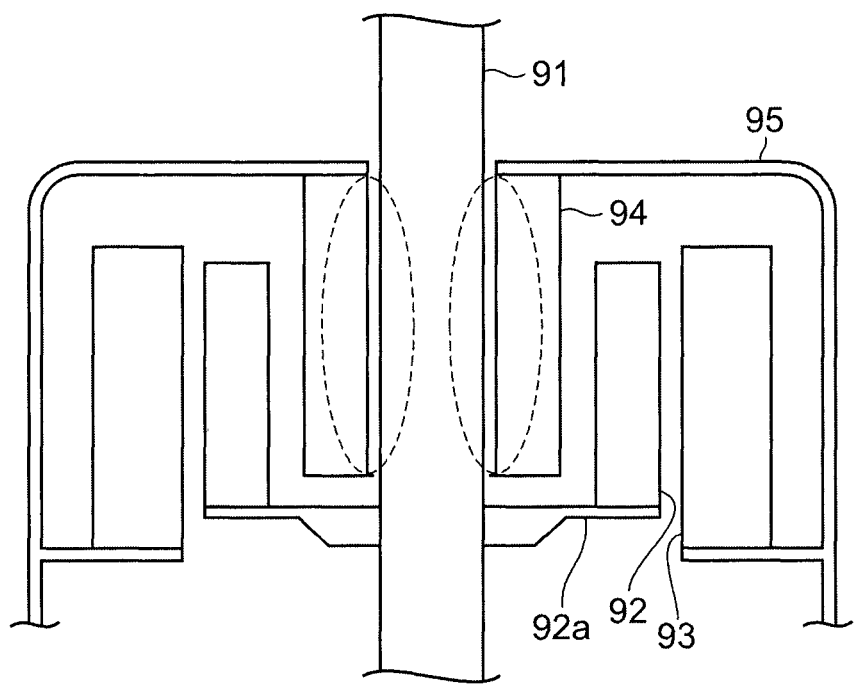
FIG. 3 is a view schematically showing an exemplary configuration of a motor inside the cooling fan according to the invention.

FIG. 3 is a view schematically showing an exemplary configuration of the motor inside the cooling fan 90. The motor inside the cooling fan 90 includes a rotary shaft 91 to which a fan (not shown) is attached, a rotor 92, a stator 93, a bearing portion 94, and a motor case 95. The rotor 92 is fixed to the rotary shaft 91 by a support member 92a. The stator 93 and the bearing portion 94 are fixed to the motor case 95. When a current is caused to flow through a coil that is wound around the stator 93, the rotor 92 rotates with respect to the stator 93. Thus, the rotary shaft 91 rotates.

The bearing portion 94 is a so-called sliding bearing (plain bearing) that is provided around the rotary shaft 91 to rotatably support the rotary shaft 91. A small gap is secured in a region between the bearing portion 94 and the rotary shaft 91 (a region surrounded by broken lines). An oil film of lubricating oil is formed in this gap. This oil film restrains the rotary shaft 91 and the bearing portion 94 from coming into contact (metal touch) with each other, thus protecting the bearing portion 94.

However, with the periphery of the cooling fan 90 at an extremely low temperature, the lubricating oil in the cooling fan 90 exhibits high viscosity, so a sufficient amount of lubricating oil may not be supplied to the gap between the bearing portion 94 and the rotary shaft 91. When the cooling fan 90 is operated in this state, the oil film between the bearing portion 94 and the rotary shaft 91 breaks, and the rotary shaft 91 or the bearing portion 94 is chipped off through metal touch. As a result, the cooling fan 90 may undergo a failure. Besides, when a structural modification is made to narrow the gap between the bearing portion 94 and the rotary shaft 91 with a view to, for example, reducing the size of the cooling fan 90, a decrease in the sliding area of the bearing portion 94 leads to the promotion of metal touch. Consequently, the cooling fan 90 is more likely to undergo a failure.

Incidentally, FIG. 3 shows an example in which the bearing portion of the cooling fan 90 is constituted by the sliding bearing (the plain bearing). However, the bearing portion of the cooling fan 90 may be constituted by a rolling bearing (a ball bearing, a roller bearing or the like). Even in the case where the bearing portion of the cooling fan 90 is a rolling bearing, with the periphery of the cooling fan 90 at an extremely low temperature, the lubricating oil (or the lubricant) protecting a rolling element and a raceway surface exhibits high viscosity, so a problem similar to that of the sliding bearing can be caused.

Thus, when the periphery of the cooling fan 90 is at an extremely low temperature, the ECU 100 according to the present embodiment of the invention prohibits the cooling fan 90 from being operated, thus restraining the cooling fan 90 from undergoing a failure.

Figure 4:
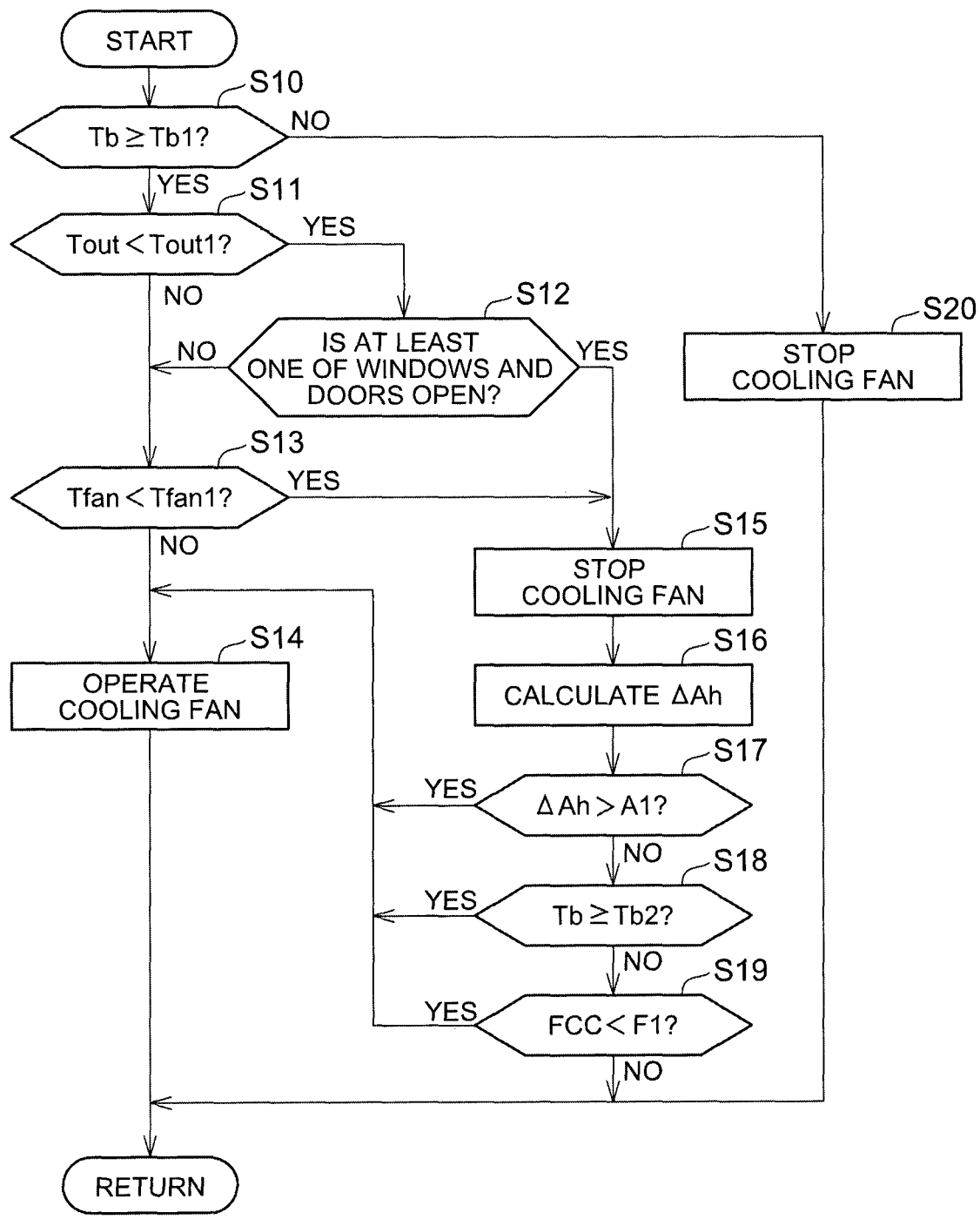
FIG. 4 is a flowchart showing a processing procedure of an ECU according to the invention.

FIG. 4 is a flowchart showing a processing procedure that is executed by the ECU 100 in controlling the cooling fan 90. This flowchart is repeatedly executed on a predetermined cycle during operation of the ECU 100.

In step (which will be abbreviated hereinafter as "S") 10, the ECU 100 determines whether or not the battery temperature Tb is equal to or higher than the temperature Tb1 (e.g., 36° C.). If the battery temperature Tb is lower than the temperature Tb1 (NO in S10), there is no need to cool the battery 70, so the ECU 100 stops the cooling fan 90 in S20.

If the battery temperature Tb is equal to or higher than the temperature Tb1 (YES in S10), there is a need to cool the battery 70. However, in the case where the periphery of the cooling fan 90 is at an extremely low temperature, when the cooling fan 90 is operated, there is a possibility of the cooling fan 90 undergoing a failure as described above. Incidentally, a situation where the battery temperature Tb is equal to or higher than the temperature Tb1 but the periphery of the cooling fan 90 is at an extremely low temperature is conceivable, for example, in the case where the vehicle 1 is caused to run for a long time in a cold district. That is, in the case where the vehicle is caused to run for a long time in a cold district, the battery 70 is charged/discharged to reach a high temperature, but the periphery of the cooling fan 90 may be at an extremely low temperature due to the outside air at an extremely low temperature.

Thus, if the battery temperature Tb is equal to or higher than the temperature Tb1 (YES in S10), the ECU 100 determines whether or not the periphery of the cooling fan 90 is at an extremely low temperature, by "an open window determination" (a process of S11 and S12) and "an intake air temperature determination" (a process of S13), which will be described hereinafter. The ECU 100 determines, based on results of those determinations, whether to permit the cooling fan 90 to be operated or not.

"The open window determination" (the process of S11 and S12) is a process of determining whether or not the outside air at an extremely low temperature that is lower than a temperature Tout1 (e.g., −30° C.) has entered the vehicle interior. Concretely, the ECU 100 first determines whether or not the outside air temperature Tout is lower than the temperature Tout1 (S11). If the outside air temperature Tout is lower than the temperature Tout1 (YES in S11), the ECU 100 determines whether or not at least one of windows and doors of the vehicle 1 is open (i.e., whether outside air can enter the vehicle interior) (S11). If all the windows and doors of the vehicle 1 are closed (NO in S12), the ECU 100 subsequently makes "the intake air temperature determination" (the process of S13).

"The intake air temperature determination" (the process of S13) is a process of determining whether or not the fan intake air temperature Tfan (the detected value of the intake air temperature sensor 4) is an extremely low temperature that is lower than a temperature Tfan1 (e.g., −30° C.). Concretely, the ECU 100 determines whether or not the fan intake air temperature Tfan is lower than the temperature Tfan1 (S13). Incidentally, "the intake air temperature determination" is carried out after "the open window determination" in the flowchart shown in FIG. 4. However, the sequence of these determinations may be reversed.

If it is determined in "the intake air temperature determination" that the fan intake air temperature Tfan is equal to or higher than the temperature Tfan1 (NO in S13), the ECU 100 permits the cooling fan 90 to be operated, and operates the cooling fan 90 in S14.

On the other hand, if it is determined in "the open window determination" that the outside air temperature Tout is lower than the temperature Tout1 and that at least one of the windows and doors of the vehicle 1 is open (YES in S11 and YES in S12), or if it is determined in "the intake air temperature determination" that the fan intake air temperature Tfan is lower than the temperature Tfan1 (YES in S13), the ECU 100 prohibits the cooling fan 90 from being operated in S15. That is, the ECU 100 stops the cooling fan 90 when the cooling fan 90 is in operation, and holds the cooling fan 90 stopped when the cooling fan 90 is stopped.

Furthermore, in the present embodiment of the invention, after the cooling fan 90 is prohibited from being operated in S15, it is determined, in "a capacity fall determination" (a process of S16 to S19) described below, whether or not higher priority should be given to the prevention of a deterioration in the battery 70 than to the prevention of a failure in the cooling fan 90. Then, in the case where it is determined that higher priority should be given to the prevention of a deterioration in the battery 70, even when the periphery of the cooling fan 90 is at an extremely low temperature, the cooling fan 90 is operated to cool the battery 70, thus giving higher priority to the prevention of a deterioration in the battery 70.

Concretely, the ECU 100 calculates a capacity fall amount ΔAh of the battery 70 resulting from its deterioration, using the battery temperature Tb at the time when the cooling fan 90 is stopped (at the time when the cooling fan 90 is stopped prior to a preceding cycle in the case where the cooling fan 90 is stopped prior to the previous cycle, and the same will hold true hereinafter) and an elapsed time from the time when the cooling fan 90 is stopped to the present (a time during which the cooling fan 90 remains stopped) as parameters, in S16. The ECU 100 calculates the capacity fall amount ΔAh as a value that increases as the battery temperature Tb at the time when the cooling fan 90 is stopped rises, and as the elapsed time from the time when the cooling fan 90 is stopped to the present lengthens.

In S17, the ECU 100 determines whether or not the capacity fall amount ΔAh has exceeded a permissible amount A1. In S18, the ECU 100 determines whether or not the current battery temperature Tb is equal to or higher than the permissible temperature Tb2 (e.g., 40° C.) that is higher than the temperature Tb1. In S19, the ECU 100 determines whether or not a full charge capacity FCC of the battery 70 has fallen below a permissible amount F1.

If the capacity fall amount ΔAh is equal to or larger than the permissible amount A1 (YES in S17), or if the battery temperature Tb is equal to or higher than the permissible temperature Tb2 (e.g., 40° C.) (YES in S18), or if the full charge capacity FCC has fallen below the permissible amount F1 (YES in S19), the ECU 100 gives higher priority to the prevention of a deterioration in the battery 70 than to the prevention of a failure in the cooling fan 90, and operates the cooling fan 90 (S14).

Figure 5:
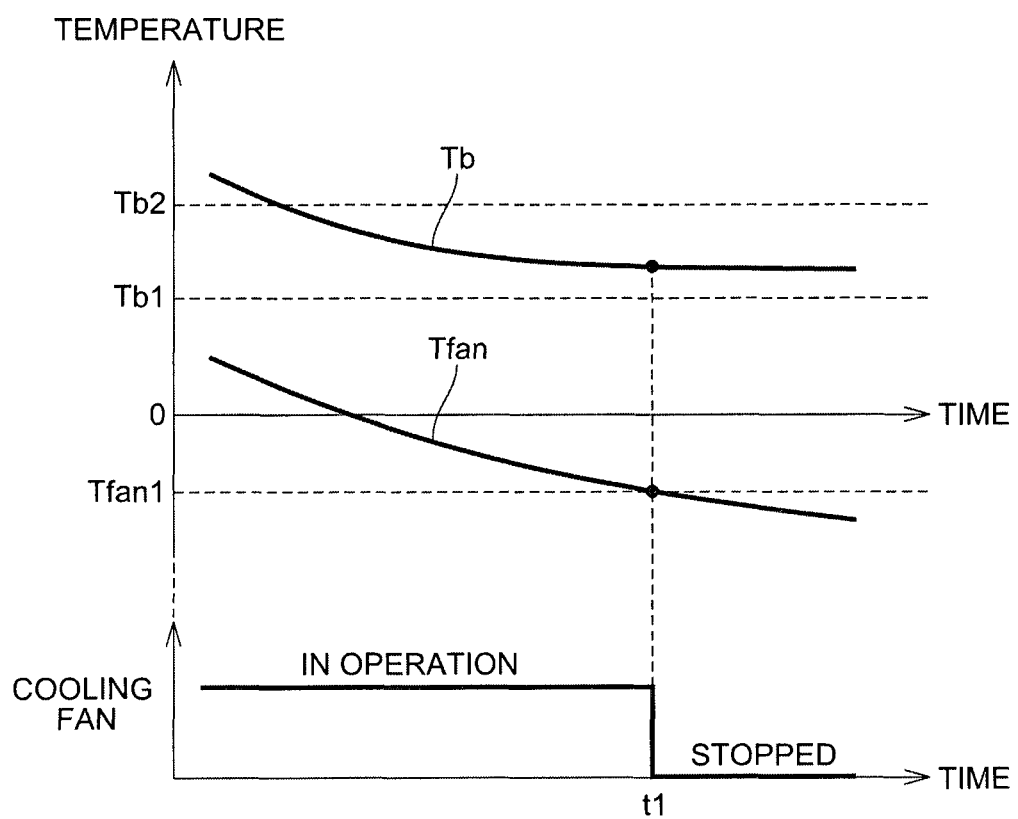
FIG. 5 is a view showing exemplary changes in a battery temperature Tb, a fan intake air temperature Tfan, and a state of the cooling fan according to the invention.

FIG. 5 is a view showing exemplary changes in the battery temperature Tb, the fan intake air temperature Tfan, and the state of the cooling fan 90 in the case where the vehicle 1 stops after having run for a long time in a cold district.

Immediately after having run for a long time in a cold district, the battery 70 has reached a high temperature by being charged/discharged, but the vehicle interior has also reached a relatively high temperature by being heated, etc. Therefore, prior to a time point t1, the battery temperature Tb is equal to or higher than the temperature Tb1 (e.g., 36° C.), and the fan intake air temperature Tfan is also equal to or higher than the temperature Tfan1 (e.g., −30° C.), so the cooling fan 90 is operated.

The battery 70 is cooled through the operation of the cooling fan 90, but the temperature of the periphery of the cooling fan 90 also falls due to outside air at an extremely low temperature. Thus, when the fan intake air temperature Tfan falls to the temperature Tfan1 at the time point t1, the battery temperature Tb is equal to or higher than the temperature Tb1 and lower than the permissible temperature Tb2, so the cooling fan 90 is stopped. Therefore, the cooling fan 90 is prevented from undergoing a failure in priority to the cooling of the battery 70.

As described above, even in the case where the battery temperature Tb is equal to or higher than the temperature Tb1, if it is determined that the periphery of the cooling fan 90 is at an extremely low temperature in "the open window determination" or "the intake air temperature determination", the ECU 100 according to the present embodiment of the invention prohibits the cooling fan 90 from being operated. Therefore, the cooling fan 90 can be prevented from undergoing a failure by being operated with the periphery of the cooling fan 90 at an extremely low temperature.

Modification Example of First Embodiment

In the aforementioned embodiment of the invention, the case where the battery temperature Tb is equal to or higher than the temperature Tb1 (e.g., 36° C.) is mentioned as a situation where the cooling fan 90 should be operated.

A case where an operation check of the cooling fan 90 is requested can be mentioned as another situation where the cooling fan 90 should be operated. The operation check of the cooling fan 90 is the control of confirming whether or not the cooling fan 90 operates normally according to an operation command by outputting the command to the cooling fan 90 on a trial basis. A case where replacement of an auxiliary battery that supplies electric power to an auxiliary system such as the cooling fan 90 and the like (which will be referred to hereinafter as "the clearing of the auxiliary") is performed, and a case where a serviceman or the like performs an operation of requesting the operation check of the cooling fan 90 through the use of a service tool (which will be referred to hereinafter as "a check request operation") can be mentioned as the case where the operation check of the cooling fan 90 is requested. The clearing of the auxiliary or the check request operation can be performed even in a state where the periphery of the cooling fan 90 is at an extremely low temperature.

Thus, when the operation check of the cooling fan 90 is requested (when the clearing of the auxiliary or the check request operation is performed), the ECU 100 according to the present modification example determines whether or not the fan intake air temperature Tfan (the detected value of the intake air temperature sensor 4) is equal to or higher than the temperature Tfan1, and determines, in accordance with a result of the determination, whether to execute the operation check of the cooling fan 90 or not.

Figure 6:
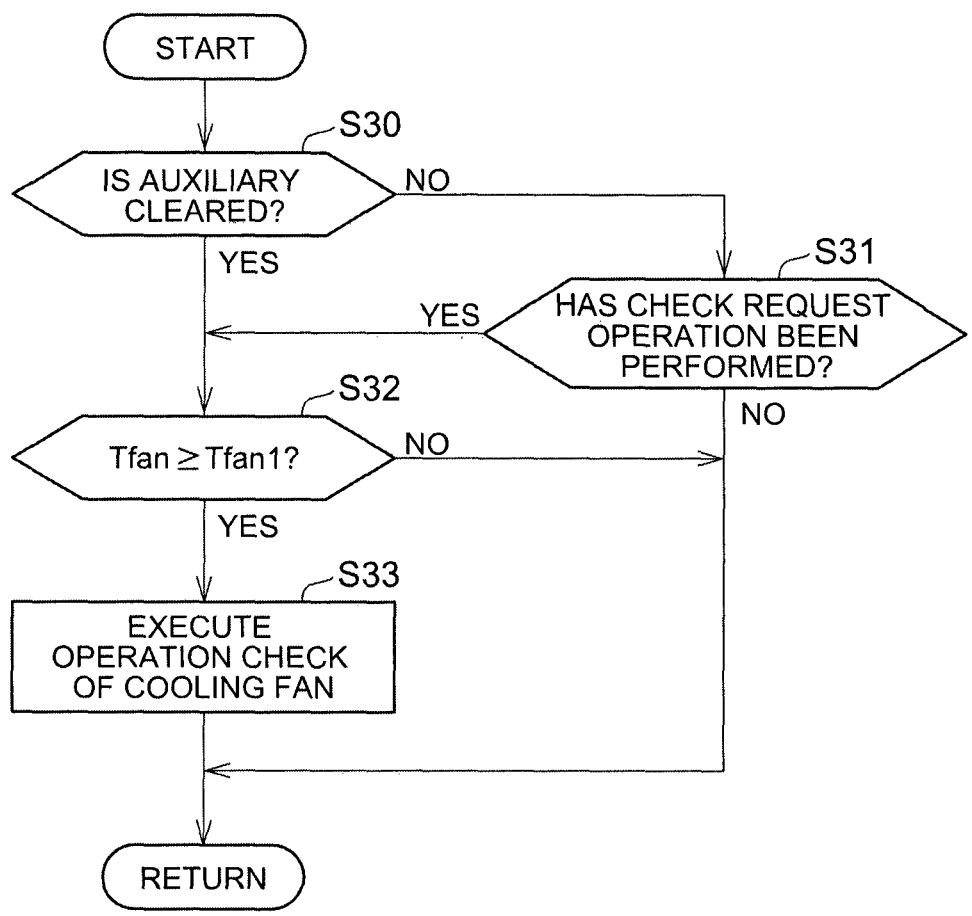
FIG. 6 is a flowchart showing a processing procedure of the ECU according to the invention.

FIG. 6 is a flowchart showing a processing procedure of the ECU 100 as to the operation check of the cooling fan 90. This flowchart is repeatedly executed on a predetermined cycle during operation of the ECU 100.

In S30 and S31, the ECU 100 determines whether or not the operation check of the cooling fan 90 has been requested. Concretely, the ECU 100 determines in S30 whether or not the aforementioned clearing of the auxiliary has been performed, and determines in S31 whether or not the aforementioned check request operation has been performed.

If the operation check of the cooling fan 90 has not been requested, that is, if neither the clearing of the auxiliary (NO in S30) nor the check request operation (NO in S31) has been performed, the ECU 100 ends the processing immediately.

If the operation check of the cooling fan 90 has been requested, that is, if the clearing of the auxiliary has been performed (YES in S30) or the check request operation has been performed (YES in S31), the ECU 100 determines in S32 whether or not the fan intake air temperature Tfan (the detected value of the intake air temperature sensor 4) is equal to or higher than the temperature Tfan1 (e.g., −30° C.). If the fan intake air temperature Tfan is equal to or higher than the temperature Tfan1 (YES in S32), the ECU 100 executes the operation check of the aforementioned cooling fan 90.

On the other hand, if the fan intake air temperature Tfan is lower than the temperature Tfan1 (NO in S32), the ECU 100 ends the processing immediately without executing the operation check of the cooling fan 90.

In this manner, the cooling fan 90 can be kept from being operated through the operation check with the periphery of the cooling fan 90 at an extremely low temperature. Therefore, the cooling fan 90 can be prevented from undergoing a failure due to the operation check of the cooling fan 90.

Second Embodiment

In the aforementioned first embodiment of the invention, when the periphery of the cooling fan 90 is at an extremely low temperature in the case where the battery temperature Tb is equal to or higher than the temperature Tb1 (e.g., 36° C.), higher priority is given to the prevention of a failure in the cooling fan 90 than to the cooling of the battery 70, and the cooling fan 90 is prohibited from being operated.

However, even in the case where the periphery of the cooling fan 90 is at an extremely low temperature, when the cooling fan 90 is actually operated, the oil film between the rotary shaft 91 and the bearing portion 94 of the cooling fan 90 does not break, and the cooling fan 90 operates normally in some cases. On the contrary, even in the case where the periphery of the cooling fan 90 is at a room temperature, when foreign matters and the like have permeated the gap between the rotary shaft 91 and the bearing portion 94 of the cooling fan 90, the friction coefficient between the rotary shaft 91 and the bearing portion 94 of the cooling fan 90 (which will be referred to hereinafter simply as "the fan friction coefficient" as well) is large, so the cooling fan 90 does not operate normally in some cases.

Thus, the ECU 100 according to the second embodiment of the invention determines, based on a difference between the fan rotational speed Nfan and the target rotational speed Nfan_tag during operation of the cooling fan 90, whether or not there is an abnormality in the fan friction coefficient, and executes control in accordance with a result of the determination.

Figure 7:
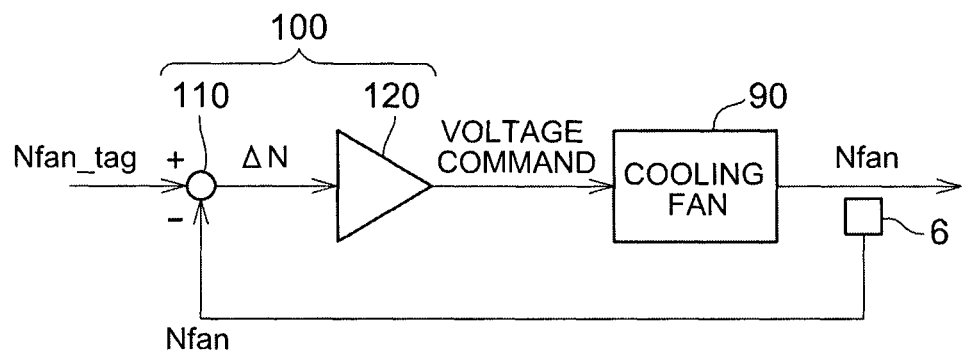
FIG. 7 is a block diagram showing a feedback control system of the cooling fan according to the invention.

FIG. 7 is a block diagram showing a feedback control system of the cooling fan 90. The feedback control system of the cooling fan 90 includes a subtraction unit 110, a command generation unit 120, and the rotational speed sensor 6. Incidentally, the subtraction unit 110 and the command generation unit 120 are realized by a piece of hardware or software inside the ECU 100.

The subtraction unit 110 calculates a value obtained by subtracting the fan rotational speed Nfan (the detected value of the rotational speed sensor 6) from the target rotational speed Nfan_tag (which will be referred to hereinafter as "a rotational speed difference $\Delta N$" as well), and outputs the calculated value to the command generation unit 120.

The command generation unit 120 generates a voltage command for making the rotational speed difference $\Delta N$ lower than a predetermined value N1, and outputs the generated voltage command to the cooling fan 90. Thus, feedback control is executed such that the fan rotational speed Nfan (the actual rotational speed of the cooling fan 90) approaches the target rotational speed Nfan_tag.

In the aforementioned feedback control system, a relationship between the rotational speed difference ΔN and the voltage command is determined in advance on the premise that the fan friction coefficient falls within a suitable range. Accordingly, when the fan friction coefficient exceeds the suitable range due to a change in the viscosity of the lubricating oil in the cooling fan 90 or the permeation of foreign matters, even the execution of the aforementioned feedback control does not allow the rotational speed difference ΔN to become lower than the predetermined value N1. Utilizing the characteristic as described herein, the ECU 100 determines whether or not there is an abnormality in the fan friction coefficient.

Figure 8:
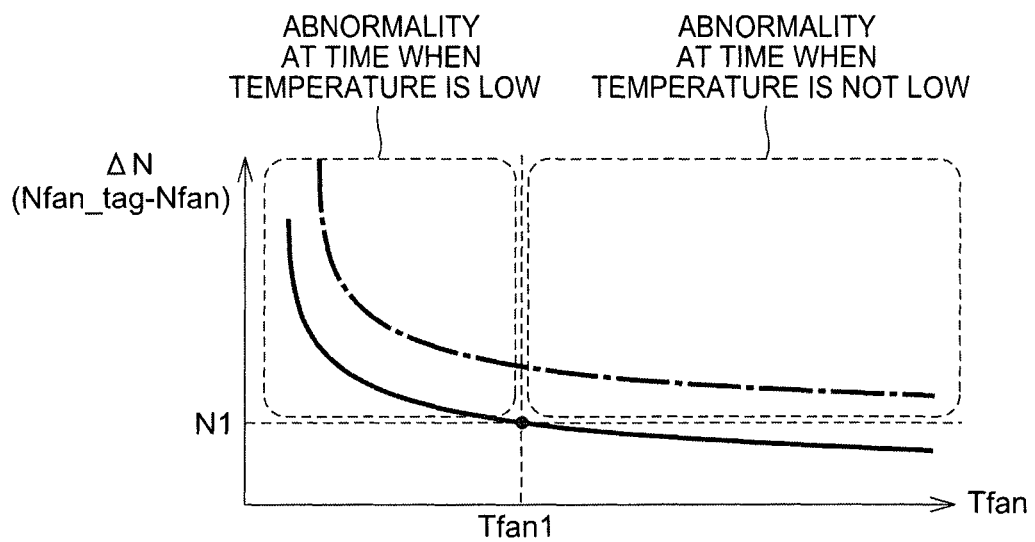
FIG. 8 is a view showing a relationship between the fan intake air temperature Tfan and a rotational speed difference ΔN according to the invention.

FIG. 8 is a view showing a relationship between the fan intake air temperature Tfan and the rotational speed difference ΔN in the case where the cooling fan 90 is controlled through feedback. Incidentally, in FIG. 8, the relationship in the case where no foreign matter or the like has permeated the gap between the rotary shaft 91 and the bearing portion 94 of the cooling fan 90 is indicated by a solid line, and the relationship in the case where foreign matters and the like have permeated the gap between the rotary shaft 91 and the bearing portion 94 of the cooling fan 90 is indicated by an alternate long and short dash line.

The fan friction coefficient and the rotational resistance are larger in the case where foreign matters and the like have permeated the gap than in the case where no foreign matter or the like has permeated the gap. Therefore, provided the fan intake air temperature Tfan remains unchanged, the rotational speed difference ΔN in the case where foreign matters and the like have permeated the gap (as indicated by the alternate long and short dash line) is higher than the rotational speed difference ΔN in the case where no foreign matter or the like has permeated the gap (as indicated by the solid line).

Besides, the viscosity of the lubricating oil in the cooling fan 90 rises as the temperature of the periphery of the cooling fan 90 falls. Accordingly, as the fan intake air temperature Tfan falls, the fan friction coefficient and the rotational resistance increase, so the rotational speed difference ΔN rises.

Therefore, in a region where the fan intake air temperature Tfan is lower than the temperature Tfan1 (e.g., −30° C.), the rotational speed difference ΔN exceeds the predetermined value N1 not only in the case where foreign matters and the like have permeated the gap (as indicated by the alternate long and short dash line) but also in the case where no foreign matter or the like has permeated the gap (as indicated by the solid line). On the other hand, in a region where the fan intake air temperature Tfan is equal to or higher than the temperature Tfan1, the rotational speed difference ΔN is lower than the predetermined value N1 in the case where no foreign matter or the like has permeated the gap (as indicated by the solid line), but the rotational speed difference ΔN is equal to or higher than the predetermined value N1 in the case where foreign matters and the like have permeated the gap (as indicated by the alternate long and short dash line).

Thus, if the fan intake air temperature Tfan is lower than the temperature Tfan1 and the rotational speed difference ΔN is equal to or higher than the predetermined value N1 (outside the suitable range), the ECU 100 determines that there is "a low-temperature abnormality", namely, that the fan friction coefficient has exceeded the suitable range due to an increase in the viscosity of lubricating oil or the permeation of foreign matters. If it is determined that there is "a low-temperature abnormality", the cooling fan 90 is likely to undergo a failure at an early stage due to the breakage of the oil film on the bearing portion. Therefore, the ECU 100 prohibits the cooling fan 90 from being operated even in a situation where the cooling fan 90 should be operated. Thus, the cooling fan 90 can be appropriately prevented from undergoing a failure.

If the fan intake air temperature Tfan is equal to or higher than the temperature Tfan1 and the rotational speed difference ΔN is equal to or higher than the predetermined value N1, the ECU 100 determines that there is "a non-low temperature abnormality", namely, that the fan friction coefficient has exceeded the suitable range due to the permeation of foreign matters instead of an increase in the viscosity of lubricating oil.

In the case of "a non-low temperature abnormality", although foreign matters and the like have permeated the gap, the oil film is unlikely to break. It is therefore inferred that the possibility of the cooling fan 90 undergoing a failure at an early stage is relatively low even when the cooling fan 90 is operated. Thus, if it is determined that there is "a non-low temperature abnormality", the ECU 100 operates the cooling fan 90 in a situation where the cooling fan 90 should be operated, and warns the users that foreign matters and the like have permeated the cooling fan 90. This makes it possible to urge the users to repair or replace the cooling fan 90 at an early stage, while attempting to cool the battery 70 (to restrain the battery 70 from deteriorating).

On the other hand, if the rotational speed difference ΔN is lower than the predetermined value N1, the fan friction coefficient is within the suitable range. Therefore, the ECU 100 operates the cooling fan 90 in a situation where the cooling fan 90 should be operated, regardless of the fan intake air temperature Tfan (even when the fan intake air temperature Tfan is lower than the temperature Tfan1). Therefore, the cooling fan 90 can be more reliably prevented from being unnecessarily prohibited from being operated, and the number of opportunities for operation of the cooling fan 90 can be made larger than in the case where the cooling fan 90 is uniformly prohibited from being operated when the fan intake air temperature Tfan is lower than the temperature Tfan1.

The embodiments of the invention disclosed herein should be considered to be exemplary and nonrestrictive in all respects. The scope of the invention is not defined by the foregoing description but by the claims. The invention is intended to encompass all the modifications that are equivalent in significance and scope to the claims.

What is claimed is:

1. A cooling device for a battery that is mounted in a vehicle, the cooling device comprising:
   a cooling fan that is configured to suck air in a vehicle interior, and to blow the sucked air to the battery;
   an intake air temperature sensor that is configured to detect a temperature of the air sucked by the cooling fan; and
   an electronic control unit, including a central processing unit and a memory, that is configured (i) to control the cooling fan, and (ii) to prohibit the cooling fan from being operated when a detected value of the intake air temperature sensor is lower than a first temperature,
   wherein the electronic control unit is further configured to control the cooling fan through feedback such that an actual rotational speed of the cooling fan becomes equal to a target rotational speed, and prohibit the cooling fan from being operated when the detected value of the intake air temperature sensor is lower than the first temperature and a difference between the actual rotational speed of the cooling fan and the target rotational speed is outside a range that is determined in advance.

2. The cooling device for the battery according to claim 1, wherein
the electronic control unit is configured (i) to operate the cooling fan when a temperature of the battery is equal to or higher than a second temperature and the detected value of the intake air temperature sensor is equal to or higher than the first temperature, and (ii) to prohibit the cooling fan from being operated when the temperature of the battery is equal to or higher than the second temperature and the detected value of the intake air temperature sensor is lower than the first temperature.

3. The cooling device for the battery according to claim 2, wherein
the electronic control unit is configured to operate the cooling fan regardless of whether or not the detected value of the intake air temperature sensor is lower than the first temperature, when the temperature of the battery is equal to or higher than a third temperature that is higher than the second temperature.

4. The cooling device for the battery according to claim 1, wherein
the electronic control unit is configured (i) to execute an operation check for confirming whether or not the cooling fan operates normally by outputting an operation command to the cooling fan, when the detected value of the intake air temperature sensor is equal to or higher than the first temperature, and (ii) to refrain from executing the operation check when the detected value of the intake air temperature sensor is lower than the first temperature, in a case where execution of the operation check is requested.

* * * * *